Aug. 23, 1932.  W. O. SNELLING ET AL  1,873,793
DENITRATION OF SPENT ACIDS
Filed Dec. 16, 1927
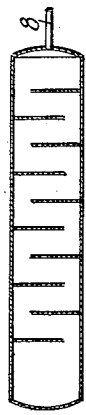
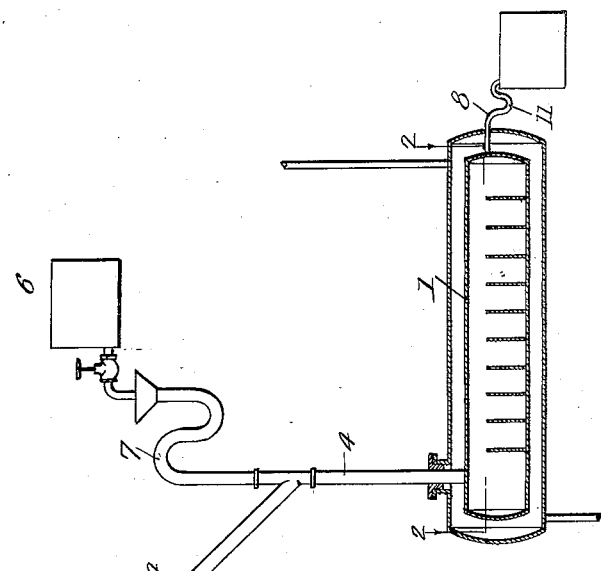
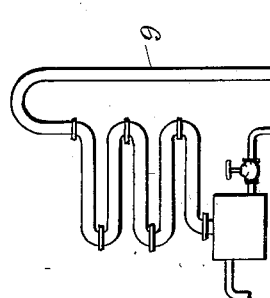
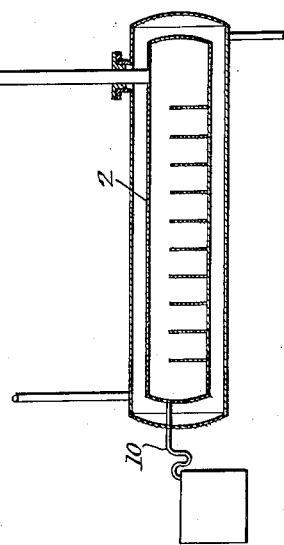
Inventors:-
Walter O. Snelling,
Joseph A. Wyler,
by their Attorneys,
Howson & Howson Patented Aug. 23, 1932

1,873,793

UNITED STATES PATENT OFFICE

WALTER O. SNELLING AND JOSEPH A. WYLER, OF ALLENTOWN, PENNSYLVANIA, ASSIGNORS TO TROJAN POWDER COMPANY, OF NEW YORK, N. Y., A CORPORATION OF NEW YORK

DENITRATION OF SPENT ACIDS

Application filed December 16, 1927. Serial No. 240,076.

This invention relates primarily to improvements in apparatus and methods for denitrating spent acids, but has a more general application to the separation of the components of any ternary mixture of a non-volatile and two volatile components.

The principal object of the invention is to provide an improved apparatus and method for accomplishing the aforenamed results while contemplating specifically the provision of a practical method for recovering the nitric and sulfuric acid components of a dilute mixture of spent acids in a desirably concentrated condition.

In the attached drawing:

Figure 1 is a diagrammatic view illustrating a suitable apparatus by means of which our improved method may be practiced, and Fig. 2 is a section on the line 2—2, Fig. 1.

We have discovered that when a dilute mixture of nitric acid and sulfuric acid is heated under such conditions that a continuous supply of the dilute mixture is admitted to a zone maintained at a higher temperature than the boiling point of water or of nitric acid, but lower than the temperature of decomposition of sulfuric acid, and the residue from distillation after a suitable concentration is continuously withdrawn from such heating zone, while the vaporous products of distillation are continuously dephlegmated under conditions permitting the escape of water and the concentration of nitric acid originally admixed with such water, we obtain a desirable separation of a mixture of nitrate acid, sulfuric acid and water into the three components of such original mixture.

With reference to the drawing, we may employ in the practice of our invention two distillation vessels 1 and 2, steam-jacketed in the present instance, and a fractionating column 3 arranged to receive the vapors passing from both of the said vessels. This fractionating column 3, however, is so arranged that the reflux liquid can only enter the vessel 2. In the present instance, the vessel 1 is connected with the fractionating tower through a pipe 4 which enters the side of the tower at a point somewhat above the bottom and at the point where the composition of the vapors in the dephlegmator corresponds approximately to the composition of the incoming vapors. The vessel 2, on the other hand, is connected with the column 3 through a pipe 5 which enters the bottom of the column, as clearly indicated.

In conjunction with the foregoing apparatus, we preferably employ a container 6 for the spent acid which is connected in the present instance through a pipe 7 with the pipe 4 at such a point that the acids flowing from the container pass into the vessel 1.

In practice, the spent acid introduced into the pipe 4 from the reservoir 6 flows into the vessel 1 the temperature of which is maintained at a point higher than the boiling point of water or of nitric acid but lower than the temperature of decomposition of sulfuric acid. In this vessel, the mixture is first separated into the non-volatile and volatile components—sulfuric acid and the mixed vapors of nitric acid and water, and the sulfuric acid component is concentrated during its passage in liquid condition through the vessel 1 to a final desired concentration, being eventually withdrawn through a discharge pipe 8 at the opposite end of the vessel from that at which it was originally introduced. The vapors of water and nitric acid pass through the pipe 4 and are fractionated in the tower 3, water vapor escaping from the top of the tower through a pipe 9 while a mixture of nitric acid and water refluxes back and through the pipe 5 into the vessel 2. In this latter vessel, the refluxed liquid is heated and further concentrated, the more concentrated nitric acid remaining in the vessel and the more dilute material in the form of vapor again passing into the fractionating tower 3. Part of the water escapes as before, and a mixture of nitric acid and water is again refluxed, the final result being a continuous outflow from the discharge pipe 10 of the vessel 2 of nitric acid of 50% to 60% strength.

By means of this apparatus and the process described above, it has been found possible to obtain in continuous operation sulfuric acid of from 70% to 90% or even greater strength, while the water passing from the dephlegmating tower is substantially pure.

To avoid overheating the sulfuric acid, we prefer to withdraw this acid through a U-tube 11 or other suitable trap when its nitric acid content has been suitably reduced to 1% or less, the hot acid being then further heated in suitable heating apparatus or being agitated with air to remove the small amounts of residual nitric acid present. In this manner, the nitric acid may be separated from the sulfuric acid with substantial completeness. If decomposition of the sulfuric acid is avoided and with proper operation, it has been possible in the practice of our invention and by means of the apparatus described above to obtain sulfuric acid of from 70% to 90% or even greater strength and nitric acid of 50% or higher. It will be noted that the production of these individual acids and of the substantially pure water from the dephlegmating column is continuous in character.

In its broad aspect, our invention is not limited to denitration of spent acid, and obviously may be broadly applied to the separation into component elements of any ternary mixture of a non-volatile component such as sulfuric acid and two volatile components such as nitric acid and water having different pressures under conditions of distillation.

It will further be evident that many modifications may be made without departing from the principles of our invention as herein disclosed. It may for example be desirable under some circumstances to employ two separate condensers or dephlegmating columns, one to receive the very dilute acid fraction which comes over during the period that the concentration of the sulfuric acid in the spent acid flasks does not exceed 50% sulfuric acid, and another condenser to catch the stronger nitric acid which comes off as the spent acid becomes more concentrated and also to reflux the nitric acid to the strength desired.

We claim:

The process of treating a ternary mixture of $H_2SO_4$, $HNO_3$ and $H_2O$, which comprises continuously heating such mixtures to volatilize the $HNO_3$ and $H_2O$ and to concentrate the $H_2SO_4$, continuously treating the volatilized components to a dephlegmating operation, segregating the refluxed product, continuously heating said product to volatilize the less concentrated portions thereof, and continuously dephlegmating said volatilized less concentrated portions and returning the refluxed product of said operation to the main body of the original refluxed liquid.

WALTER O. SNELLING.
JOSEPH A. WYLER.